US005607087A

United States Patent [19]

Wery et al.

[11] Patent Number: 5,607,087

[45] Date of Patent: Mar. 4, 1997

[54] PRESSURIZED FLUID DISPENSING DEVICE

[76] Inventors: Shawn D. Wery, Main Post Office 100 S 1st, Minneapolis, Minn. 55001; John F. Luca, 52 E. Burdick, Oxford, Mich. 48371

[21] Appl. No.: 308,572

[22] Filed: Sep. 19, 1994

[51] Int. Cl.[6] .................... A01C 15/04

[52] U.S. Cl. .................... 222/610; 222/401; 224/412; 285/305

[58] Field of Search .................... 222/610, 394, 222/401, 608; 224/30 R, 39, 36, 926; 280/288.4; 285/305, 314, 316; 141/64, 364, 95

[56] References Cited

U.S. PATENT DOCUMENTS

| | | | |
|---|---|---|---|
| 581,767 | 8/1897 | Powers | 239/33 |
| 1,297,719 | 3/1919 | Myers | 285/314 |
| 2,915,222 | 12/1959 | Purinton | 222/175 |
| 3,145,653 | 8/1963 | Lake | 101/364 |
| 3,160,330 | 12/1964 | Pollitt | 222/209 |
| 3,459,333 | 8/1969 | Inglefield | 222/64 |
| 3,677,446 | 7/1972 | Guyer | 222/177 |
| 3,992,706 | 12/1976 | Tunney | 340/239 |
| 4,095,812 | 6/1978 | Rowe | 222/608 |
| 4,139,130 | 2/1979 | Glusker | 224/5 |

(List continued on next page.)

*Primary Examiner*—Gregory L. Huson
*Assistant Examiner*—Lisa Douglas
*Attorney, Agent, or Firm*—Harness, Dickey & Pierce, P.L.C.

[57] ABSTRACT

A pressurized fluid dispensing device for storing and dispensing pressurized fluid, such as water, to individuals during the performance of their particular activity, particularly activities such as cycling, wind surfing, rock climbing, in line skating, auto racing, jogging, and within handicapped populations where hand dexterity is limited. The pressurized fluid dispensing device may be mounted to such mountables as a bicycle frame, wheel chair frame, car dash, and may even be worn on the body by mounting the device to what is commonly known as a water bottle or fanny pack located on the waist of the individual. The device includes a fluid vessel, support cage (optional), male coupling member, a vessel cap with a female coupling member with a check valve incorporated within, tubing, actuateable valve, and a pressure adapter with a check valve. The fluid vessel is pressurized by slidingly inserting the pressure adapter and charging the system with a common air pressurizing system. The vessel now acts as a pre-charged cassette and may be sealingly engaged with the male coupling member which activates the one way valve and allows the contents to flow through the tubing to the actuateable valve. The valve is actuated by deforming the hollow member by activities such as biting with the mouth or pinching with the fingers.

20 Claims, 8 Drawing Sheets

U.S. PATENT DOCUMENTS

| | | | |
|---|---|---|---|
| 4,148,459 | 4/1979 | Martinez | 285/316 |
| 4,150,681 | 4/1979 | Howarth | 134/172 |
| 4,159,790 | 7/1979 | Bailey | 222/211 |
| 4,274,552 | 6/1981 | Proni | 222/61 |
| 4,274,566 | 6/1981 | Rowe | 224/35 |
| 4,284,209 | 8/1981 | Barbour | 222/1 |
| 4,286,636 | 9/1981 | Credle | 141/114 |
| 4,340,157 | 7/1982 | Darner | 222/211 |
| 4,359,174 | 11/1982 | Ikunosuke | 222/131 |
| 4,368,897 | 1/1983 | Brown | 280/202 |
| 4,386,721 | 6/1983 | Shimano | 224/39 |
| 4,420,097 | 12/1983 | Motsenbocker | 222/131 |
| 4,441,638 | 4/1984 | Shimano | 224/35 |
| 4,449,653 | 5/1984 | Pirolli | 224/35 |
| 4,483,367 | 11/1984 | Ross, Jr. et al. | 141/95 |
| 4,544,087 | 10/1985 | Modig | 224/148 |
| 4,629,098 | 12/1986 | Eger | 222/175 |
| 4,649,968 | 3/1987 | Berrettini et al. | 141/95 |
| 4,717,051 | 1/1988 | Leclerc | 222/345 |
| 4,721,331 | 1/1988 | Lemelshtrich | 285/305 |
| 4,739,905 | 4/1988 | Nelson | 222/145 |
| 4,763,683 | 8/1988 | Carmack | 141/346 |
| 4,807,813 | 2/1989 | Coleman | 239/153 |
| 4,813,933 | 3/1989 | Turner | 604/79 |
| 4,815,635 | 5/1989 | Porter | 222/136 |
| 4,830,240 | 5/1989 | Tackles | 224/148 |
| 4,852,781 | 8/1989 | Shurnick et al. | 224/148 |
| 4,886,176 | 12/1989 | Steakley | 215/229 |
| 4,911,339 | 3/1990 | Cushing | 222/610 |
| 4,928,859 | 5/1990 | Krahn | 222/402.14 |
| 4,930,668 | 6/1990 | Krall | 222/212 |
| 4,969,493 | 11/1990 | Lee | 141/95 |
| 5,027,855 | 7/1991 | Jaggi | 137/614.04 |
| 5,040,709 | 8/1991 | Neugent | 224/35 |
| 5,046,648 | 9/1991 | Herbstzuber | 222/638 |
| 5,062,591 | 11/1991 | Runkel | 224/148 |
| 5,095,962 | 3/1992 | Lloyd-Davies et al. | 141/346 |
| 5,104,016 | 4/1992 | Runkel | 222/608 |
| 5,119,978 | 6/1992 | Kalamaras et al. | 224/32 R |
| 5,158,218 | 10/1992 | Wery | 222/610 |
| 5,201,442 | 4/1993 | Bakalian | 222/610 |
| 5,213,309 | 5/1993 | Makishima | 141/346 |
| 5,215,231 | 6/1993 | Paczonay | 222/610 |
| 5,326,124 | 9/1994 | Allemang | 280/288.4 |
| 5,358,142 | 10/1994 | Holmes | 222/1 |

PRESSURIZED FLUID DISPENSING DEVICE

FIELD OF INVENTION

The present invention relates generally to devices for storing and dispensing fluids and, specifically, to a device for storing and dispensing fluids such as water to athletes, handicapped, and other individuals similarly situated during the performance of their particular activity with or without using their hands.

BACKGROUND OF THE INVENTION

In activities such as cycling, wind surfing, rock climbing, in-line skating, auto racing, jogging, and within handicapped populations there occurs a problem when the individual does not wish to stop their activity or is unable to use their hands to rehydrate themselves. For a cyclist, it is known to employ removable drinking bottles or the like that may be removably mounted along the bicycle frame to be removed by the rider during use of the bicycle. However, such water bottles have several disadvantages and limitations associated with their use. For example, one problem associated with the use of the type of devices disclosed in U.S. Pat. Nos. 4,441,638 (Shimano) and 4,386,721 (Shimano), is that use of the device diverts the rider's attention from the road for both removal and return of the bottle to its support cage or holder. During consumption of the fluid the rider's vision and attention is distracted from the road or terrain. In addition the rider is forced to steer and balance the bicycle with only one hand. It is also necessary for the rider to change their body position from a more optimum position to a more compromised position.

Devices for storing and/or dispensing fluids, such as water, are well known within the art and have had various forms and functions over the years. For example, U.S. Pat. No. 5,158,218 (Wery), discloses a pressurized fluid dispensing device for storing and dispensing pressurized fluid. The device has a vessel which is generally described as wedged-shaped and is designed to fit into a specific location on a conventionally designed bicycle frame. Once the vessel is pressurized it is then inserted into a cage which then actuates a check valve which allows the fluid to flow through a flexible tube to the bite valve. The bite valve is controlled by either biting the valve or pinching with the fingers. This arrangement is limited to conventional bicycle frames and will not accommodate newer more radical styles. Other features lacking from this design are: (1) a relief valve which visually and auditorily lets the user know when they have reached the appropriate pressure for the device to function, (2) a quick connecting/disconnecting clip member which locks the vessel to the cage thereby keeping the check valve open and securing the vessel in the cage while covering rough terrain, (3) a vessel shape other than one that is wedged or V-shaped, (4) vessels with only one orifice thereby reducing the chance of leakage, and (5) shapes and sizes which would not limit this device to bicycling.

U.S. Pat. No. 5,215,231, issued Jun. 1, 1993, discloses an apparatus which acts as holder or cage for a flexible walled vessel. The cage has at least one compression element movably mounted relative to the holder means and movable between a first position and a second position where when moved to the second position substantially compresses the vessel forcing the liquid out of the vessel through a check valve which prevents back flow to the individual via tubing. The arrangement shown in this patent would appear to require an individual to squeeze or pump the compression element each time the individual desires a drink. This would fatigue the rider's grip and limits the rider to a discontinuous flow of liquid. Further, this device is limited to individuals who have use of their hand(s).

U.S. Pat. No. 5,062,591, issued Nov. 5, 1991, discloses a inflatable bladder with an conduit and valves for conveying the beverage to the individual. The patent describes an arrangement where the liquid is forced into the bladder with an auxiliary hand pump and a check valve. Once full the hand pump is then removed and the system is complete. One drawback of this device is that the bladder does not completely empty itself, this leaving a medium available for the growth of bacteria. Further this system does not allow the individual to refill the system while performing their activity. Also, cleaning the system would appear to be time consuming and difficult.

U.S. Pat. No. 4,815,635, issued Mar. 28, 1989, discloses a water supply apparatus for use by a bicyclist employing a diaphragm-type pump located at the end of a piece of tubing, the other end of which is connected to a water bottle. The pump is operated by manipulating a lever located on the handlebars. The tubing directs the beverage to a mouth piece which may be reached by the rider's mouth. This arrangement appears to require a substantial amount of pumping and does not allow for quick refills while the individual is performing their activity. Furthermore this limits the individual to a discontinuous flow of fluid, and the individual must have use of their hands to operate the system.

U.S. Pat. No. 4,911,339, issued Mar. 27, 1990, discloses a water supply apparatus which employs pleated bellows which are mourned to one end of a vessel which contains the beverage. The bellows are pumped to pressurize the inside of the vessel thereby displacing the liquid out to a valve via tubing, to a mouth piece located on the handle bars. This invention appears to require a substantial amount of pumping to maintain the pressure and does not allow for quick refills while the individual is performing their activity. Further, the individual must have use of their hands to operate the system.

U.S. Pat. No. 4,150,681, issued Apr. 24, 1979, discloses a washing apparatus for cleaning the lenses of goggles, worn by motorcyclists. The patent describes a pressurized vessel which has a flexible tube running to a jet spray nozzle located on the visor of the helmet. The spray is controlled by a finger actuated control valve This device does not allow for quick refills while the individual is performing their activity. Further, the individual must have use of their hands to operate the system.

Other representative patents disclosing liquid dispensing systems for use by bicyclists and others are as follows: U.S. Pat. No. 581,767, issued May 4, 1897, U.S. Pat. No. 2,915,223, issued Dec. 1, 1959, U.S. Pat. No. 3,145,653, issued Aug. 25, 1964, U.S. Pat. No. 3,459,333, issued Aug. 5, 1969, U.S. Pat. No. 3,677,446, issued Jul. 18, 1972, U.S. Pat. No. 4,095,812, issued Jun. 20, 1978, U.S. Pat. No. 4,139,130, issued Feb. 13, 1979, U.S. Pat. No. 4,150,681, issued Apr. 24, 1979, U.S. Pat. No. 4,159,790, issued Jul. 3, 1979, U.S. Pat. No. 4,274,552, issued Jun. 23, 1981, U.S. Pat. No. 2,274,566, issued Jun. 23, 1981, U.S. Pat. No. 4,286,636, issued Sep. 1, 1981, U.S. Pat. No. 4,340,157, issued Jul. 20, 1982, U.S. Pat. No. 4,359,174, issued Nov. 16, 1982, U.S. Pat. No. 4,386,721, issued Jun. 7, 1983, U.S. Pat. No. 4,420,097, issued Dec. 13, 1983, U.S. Pat. No. 4,441,638, issued Apr. 10, 1984, U.S. Pat. No. 4,544,087, issued Oct. 1, 1985, U.S. Pat. No. 4,629,098, issued Dec. 16, 1986, U.S. Pat. No. 4,717,051, issued Jan. 5, 1988, U.S. Pat. No.

4,739,905, issued Apr. 26, 1988, U.S. Pat. No. 4,807,813, issued Feb. 28, 1989, U.S. Pat. No. 4,813,933, issued Mar. 21, 1989, U.S. Pat. No. 4,815,635, issued Mar. 28, 1989, U.S. Pat. No. 4,830,240, issued May 16, 1989, U.S. Pat. No. 4,852,781, issued Aug. 1, 1989, U.S. Pat. No. 4,911,339, issued Mar. 27, 1990, U.S. Pat. No. 4,928,859, issued May 29, 1990, U.S. Pat. No. 4,930,668, issued Jun. 5, 1990, U.S. Pat. No. 5,027,855, issued Jul. 2, 1991 and U.S. Pat. No. 5,040,709, issued Aug. 20, 1991.

From the previously mentioned patents it has been desirable to have a pressurized fluid dispensing device which would eliminate the problems and limitations associated with the prior devices discussed above, the most significant of the problems being associated with the use of such devices in activities where it is desired to rehydrate without the use of the individual's hands, have a continuous flow of fluid available, and have a method of quickly refilling the system.

SUMMARY OF THE INVENTION

In contrast to the prior devices discussed above, it has been found that a pressurized fluid dispensing device particularly suited for use during activities such as bicycling, car racing, triathlons, rock climbing, wheel chairing and the like can be constructed which is able to dispense fluid contained therein without diverting the attention of the rider from their activity and without requiring manipulation of the device by the individual's hand. In addition, the present invention is lightweight, and able to be mounted on a number of different vehicles, locations, and even worn on the body. Further, the vessel is removable and easily replaced to ensure that sufficient fluids are available throughout the activity. The vessel is locked into the support cage by a quick connecting/disconnecting clip member ensuring the stability of the vessel while rough terrain is encountered. This quick connect/disconnect clip member allows for quick exchanges with other vessels.

The pressurized fluid dispensing device of the present invention includes a fluid vessel, support cage (optional), male coupling member, a female coupling member with a check valve incorporated within, tubing, actuateable valve, dip tube (optional), and a pressurizing adapter with a check valve incorporated within. The vessel is for storing a fluid therein under pressure, and is adapted to include a sealable opening. The support cage is for releasably supporting the vessel and sealingly engaging the vessel means by the male coupling member mounted to the support cage. The dip tube is for communicating the fluid from the vessel to the female coupling member when the vessel is required to function in an upright position. The tubing is for communicating the fluid from the vessel to the actuateable valve and to the individual upon actuation. The female coupling member check valve is in fluid communication with the vessel, the male coupling member and the tubing so that when the vessel is sealingly engaged with the support cage and male coupling member, fluid may flow through the check valve from the vessel along the interior of the tubing to the actuateable valve. The male coupling member is insertable into the front end of the female coupling member. Seal means cooperates with an internal surface of the female coupling member for providing a fluid tight seal between the male and female coupling members upon insertion of the male coupling member into the female coupling member. A quick connecting/disconnecting clip member is slidably mounted on the female coupling member. The clip member is slidable between a connecting position wherein it engages the male coupling member and a disconnecting position when it is disengaged from the male coupling member. When engaged with the male coupling member, the clip member retains the male and female coupling members in a coupled state. The pressure adapter is for communicating air from a pressurizing system to the vessel, while the incorporated check valve alerts the user that the appropriate pressure has been reached while also limiting the amount of air that may be communicated. The actuateable valve is sealingly connected to an end of tubing for selectively dispensing fluid from the tubing upon actuation of the valve by the mouth or hands of the individual.

In the disclosed embodiment, the pressurized fluid dispensing device is for use by individuals during activities such as cycling, wind surfing, rock climbing, in-line skating, auto racing, jogging, and within handicapped populations where hand dexterity is limited. The device includes a vessel, female coupling member with a check valve located within, support cage (optional), male coupling member, tubing, actuateable valve, dip tube (optional), and a pressure adapter. The vessel is for storing a fluid therein under pressure, and the vessel is adapted to include a sealable opening through which fluid may be introduced into the vessel. The female coupling member is sealingly engageable with the vessel. The dip tube is sealingly engageable with the female coupling member The support cage is mountable to such mountables as the frame of a bicycle for releasably supporting the vessel. The male coupling member is sealingly engageable with another end of the female coupling member and when engaged actuates the check valve located within the female coupling. The quick connecting/disconnecting clip member is mounted on the female coupling member. When the male coupling member is inserted into the female coupling member the slidable clip member engages and retains the male and female coupling members in a coupled state until the quick connect/disconnect clip member is disengaged by the operator. The male coupling member may or may not be attached to the support cage. The male coupling member is sealingly engaged with the tubing. The actuateable valve is sealingly connected to another end of the tubing for selectively dispensing fluid from the tubing upon actuation of the valve by the mouth or hands of the individual.

The female coupling member is adapted for engagement with a male pressuring adapter with a check valve incorporated within. The male pressurizing adapter is insertable into the front end of the female coupling member. Once inserted into the female coupling member, the slidable clip member engages and retains the male pressurizing adapter and female coupling member in a coupled state until the quick connect/disconnect clip member is disengaged by the operator. Seal means cooperates with an internal surface of the female vessel cap for providing a fluid tight seal between the male pressurizing adapter and female coupling member upon insertion of the male pressurizing adapter into the female coupling member. Once inserted the pressurizing adapter allows the vessel to be pressurized by a pressurizing device. The check valve located within the male pressurizing adapter limits the pressure introduced to the vessel.

In an alternative embodiment, this invention comprises a pressurized drinking apparatus for a runner or the like, characterized by a pressurized vessel to provide fluid to an individual via tubing to a valve actuateable by mouth or hand. The vessel would most likely be mounted in what is commonly known as a water bottle pack or fanny pack located on the waist of the individual. The pressurized fluid dispensing device of the present invention includes a vessel, a male coupling member, a female coupling member with a one-way check valve incorporated, actuateable valve, tubing, dip tube, and a pressurizing adapter with a check valve. The vessel is adapted to include a sealable opening. The female coupling member with a check valve located within is sealingly engageable with the vessel. The dip tube is sealingly engageable with the female coupling member providing a fluid tight seal between the fluid and the female coupling member. The male coupling member is insertable into the front end of the female vessel cap. Seal means cooperates with an internal surface of the female vessel cap for providing a fluid tight seal between the male and female coupling members upon insertion of the male coupling member in the female member. A quick connecting/disconnecting clip member is slidably mounted on the female coupling member. The clip member is slidable between a connecting position wherein it engages the male coupling member and a disconnecting position when it is disengaged from the male coupling member. When engaged with the male coupling member, the clip member retains the male and female coupling members in a coupled state. The male coupling member is sealingly engaged with the tubing. The tubing is for communicating the fluid from the vessel to the actuateable valve and then to the individual. The actuateable valve is sealingly connected to an end of tubing for selectively dispensing fluid from the tubing upon actuation of the valve by the mouth or hands of the individual.

In an alternative embodiment, the pressurized fluid dispensing device of the present invention includes a vessel, a female coupling member with a check valve located within, a support cage, a male coupling member, tubing, a male pressurizing adapter, and an actuateable valve. The vessel has a top, a bottom, a generally vertical side, a generally circular side, and a sealable opening in the top, with the vessel being pressurizable. The female coupling member is screwably engaged with the vessel. The support cage is mountable to such mountables as a bicycle frame and has a generally vertical side, a generally circular side, and a bottom. The mounting assembly attaches the support cage to the bicycle frame. The male coupling member is mounted in the bottom of the support cage. The male coupling member is insertable into the front end of the female vessel cap. Seal means cooperates with an external surface of the female vessel cap for providing a fluid tight seal between the male and female coupling members upon insertion of the male coupling member in the female member. A quick connecting/disconnecting clip member is slidably mounted on the female coupling member. The clip member is slidable between a connecting position wherein it engages the male coupling member and a disconnecting position when it is disengaged from the male coupling member. When engaged with the male coupling member, the clip member retains the male and female coupling members in a coupled state. The male coupling member extends from the top of the bottom of the support cage, in fluid communication with the female coupling member which is screwably engaged with the vessel. When the male and female coupling members are sealingly engaged, the check valve located within the female coupling member is actuated and fluid may flow through from the vessel to the male coupling member, which is sealingly engaged with the first end of the flexible tubing. The second end of the tubing is sealingly engaged with the actuateable valve for selectively dispensing fluid from the tubing upon actuation of the actuateable valve by the mouth or hands of the individual.

In the preferred embodiment, the actuateable valve includes a deformable, hollow member, a check ball, whereby when a cyclist deforms the deformable, hollow member by biting or pinching thereon, fluid is released through one end thereof. In addition, the support cage is mountable above a crank assembly of the bike and engageable with a generally vertical and/or diagonal support of the frame. The check valve located within the female coupling member is receivable to the male coupling member which when coupled permits the flow of fluid through the check valve.

Further, the device includes a female coupling member for screwably sealing the opening in the vessel. Also, the vessel is of generally vertical and circular shape and the support cage is of generally vertical and circular shape.

BRIEF DESCRIPTION OF DRAWINGS

The various features, objects, benefits, and advantages of the present invention will become more apparent upon reading the following detailed description of the preferred embodiment along with the appended claims in conjunction with the drawings, wherein like reference numerals identify corresponding components, and:

DETAILED DESCRIPTION OF THE PREFERRED EMBODIMENT

The pressurized fluid dispensing device of the present invention is illustrated in FIGS. 1–8 and is generally designated as 30.

Figure 1:
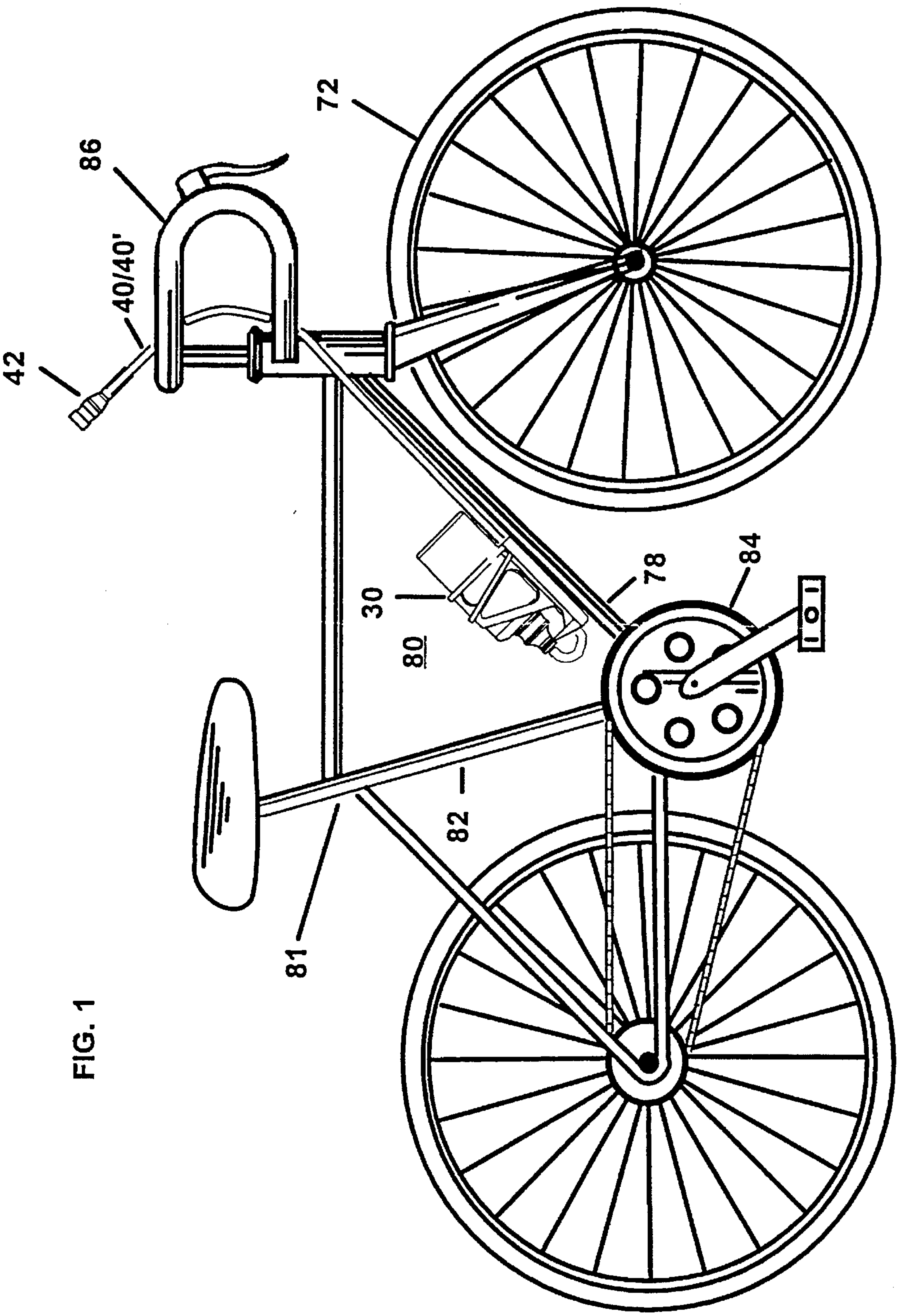
FIG. 1 is a perspective side view of a bicycle illustrating the pressurized fluid dispensing device of the present invention mounted to the frame of the bicycle.
Figure 2:
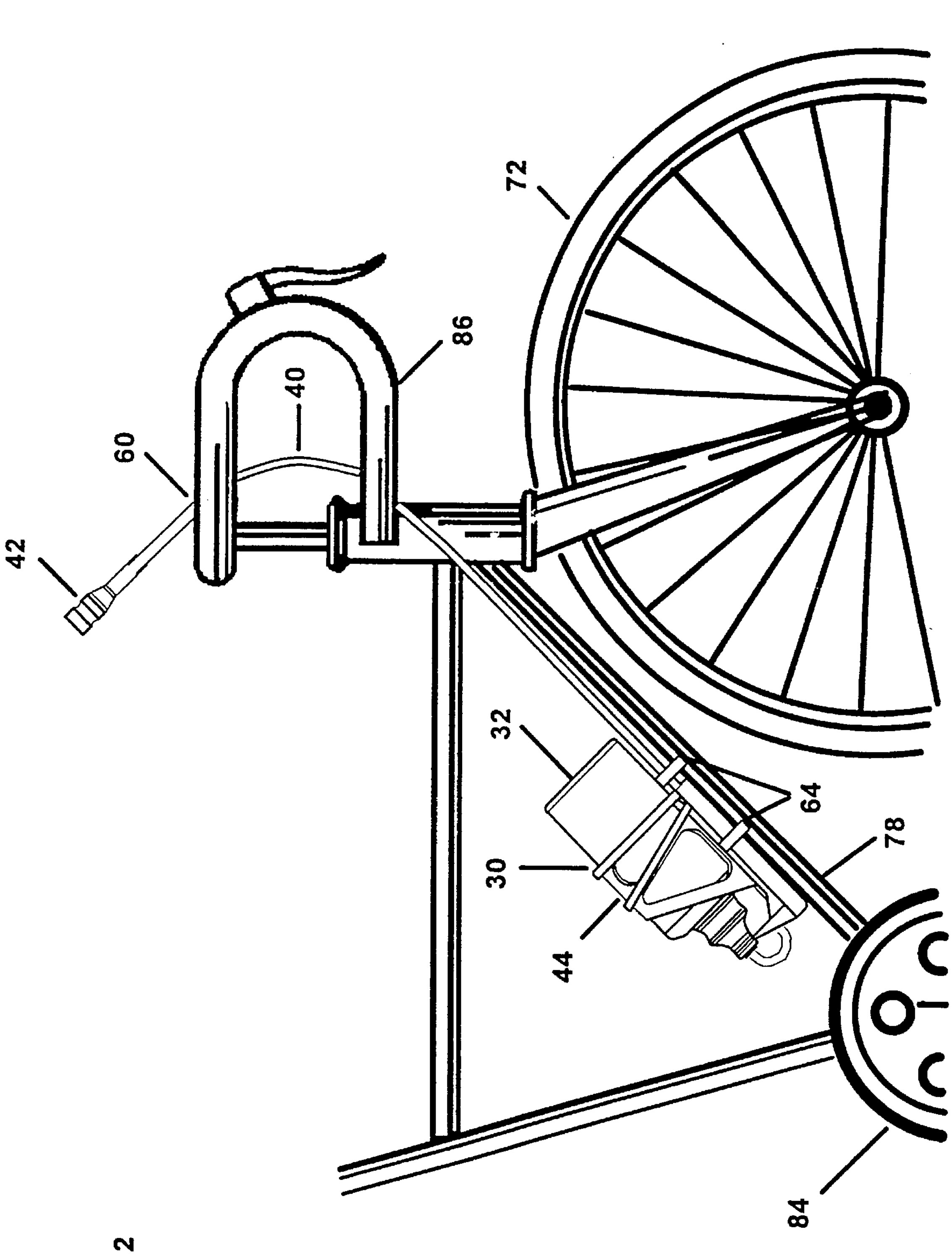
FIG. 2 is an enlarged, fragmentary view of the bicycle illustrated in FIG. 1.

Referring to FIG. 1, the pressurized fluid dispensing device 30 of the present invention may be mounted to the frame 81 of a bicycle 72. As illustrated in greater detail in FIGS. 2 and 3, the pressurized fluid dispensing device 30 is mounted along the diagonal support 78, but may be mounted to either of the 3 triangular frame members 80.

The pressurized fluid dispensing device 30 of the present invention includes a vessel 32, a female coupling member with a check valve located within 34, a support cage or housing 44, a male coupling member 36, tubing 40, a male pressurizing adapter 38, and an actuateable valve 42. The tubing 40, is preferably flexible and of sufficient length to extend from the pressurized fluid dispensing device 30, along the bicycle frame 81, and past the handle bars 86 of the bicycle. In addition, the tubing may include a second piece of tubing, 40', which is stiffer and will retain its shape and positioning upon being bent, such tubing 40' may include wire reinforced tubing.

The tubing 40 or 40' may be attached to the handle bars 86 by a zip tie, clamp or other means 60 for attaching and holding the tubing in place.

Figure 6:
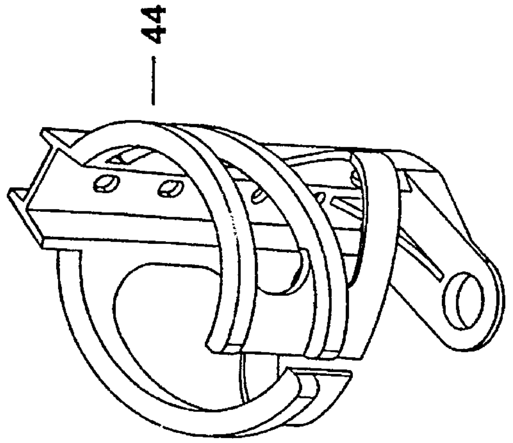
FIG. 6 is a perspective of the support cage of the pressurized fluid dispensing device.
Figure 7:
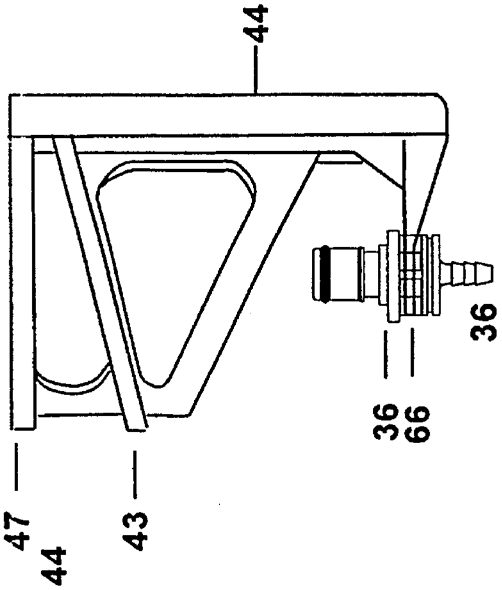
FIG. 7 is a side view of the support cage with a male coupling member mounted.
Figure 5:
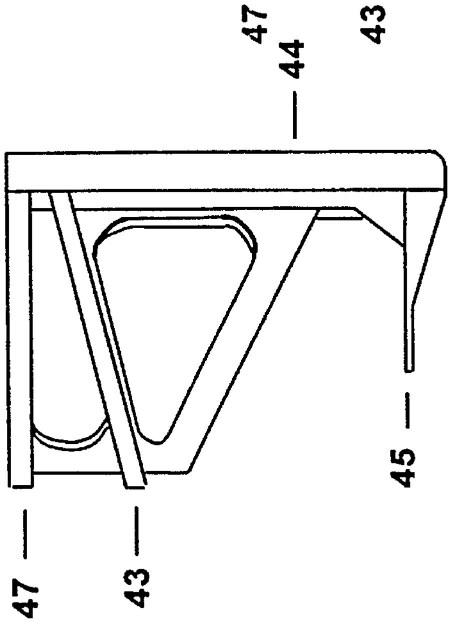
FIG. 5 is a side view of the support cage of the pressurized fluid dispensing device.

In the preferred embodiment of the pressurized fluid dispensing device 30 of the present invention illustrated in FIGS. 5 and 6, the support cage 44 is generally circular in shape and includes a bottom 45. The upper arm 47 is to help center the vessel 32 upon insertion into the support cage or housing 44.

As illustrated in FIG. 6, the upper arm 47 centers the vessel as it is inserted into the two lower arms 43 of the support cage or housing 44. In the preferred embodiment the lower arms 43 of the support cage or housing 44 are sufficiently flexible to accommodate the larger sized vessel.

Figure 13:
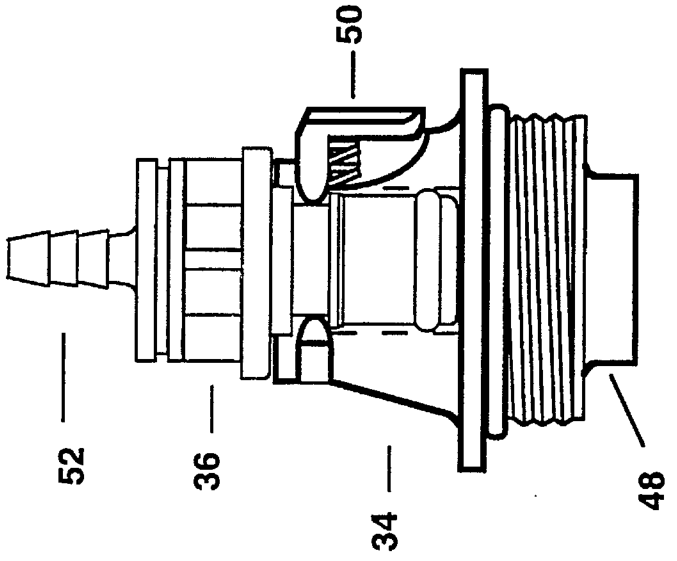
FIG. 13 is a fragmentary view of the female coupling member and the male coupling member.
Figure 12:
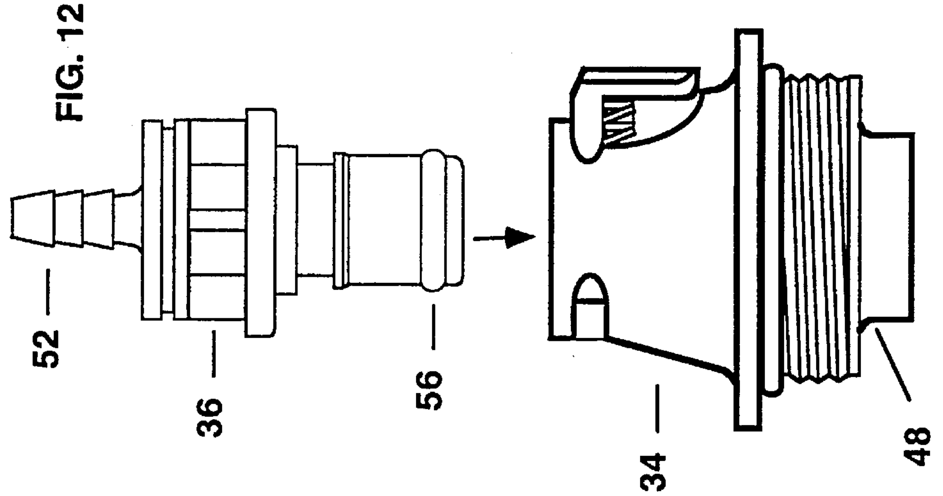
FIG. 12 is a side view illustrating insertion of the male coupling member into the female coupling member.
Figure 11:
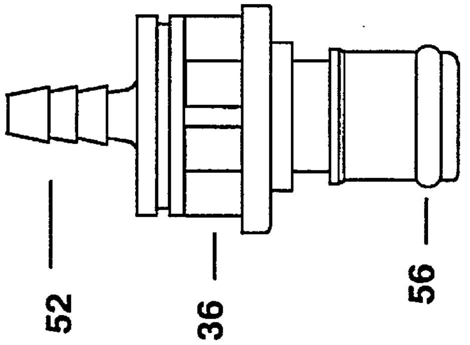
FIG. 11 is a side view of the male coupling member.
Figure 15:
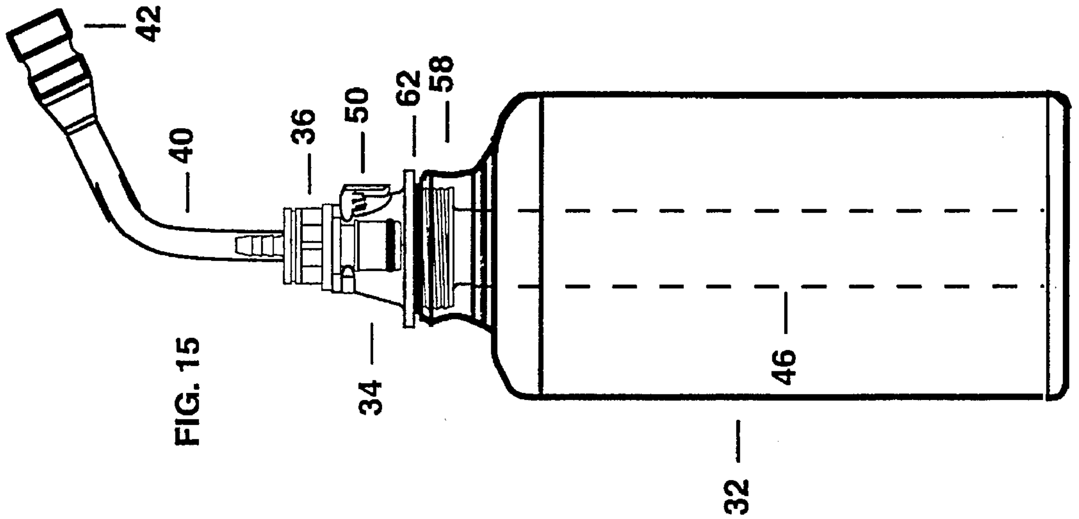
FIG. 15 is a side view of the fluid vessel of the pressurized fluid dispensing device illustrating the dip tube.
Figure 14:
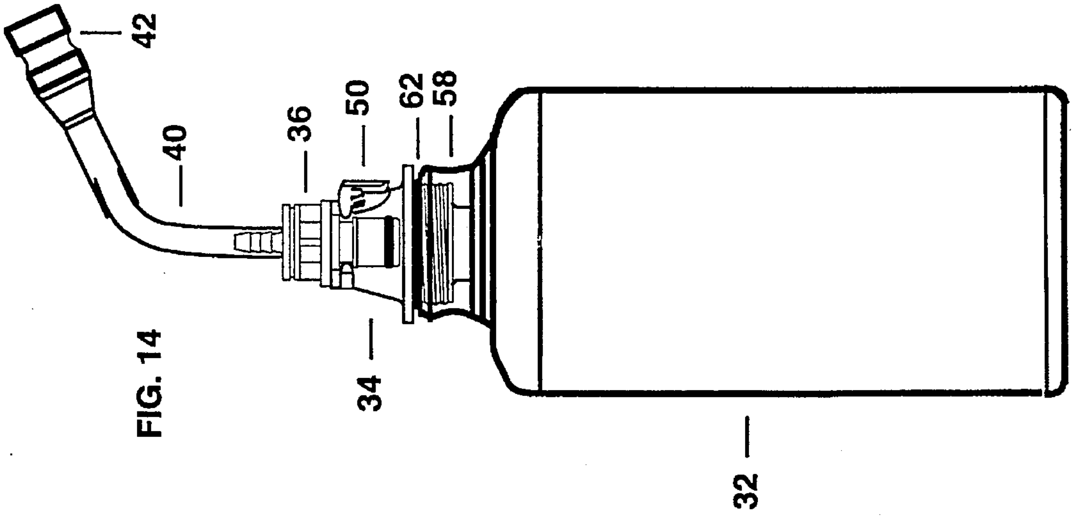
FIG. 14 is a side view of the fluid vessel of the pressurized fluid dispensing device.
Figure 16:
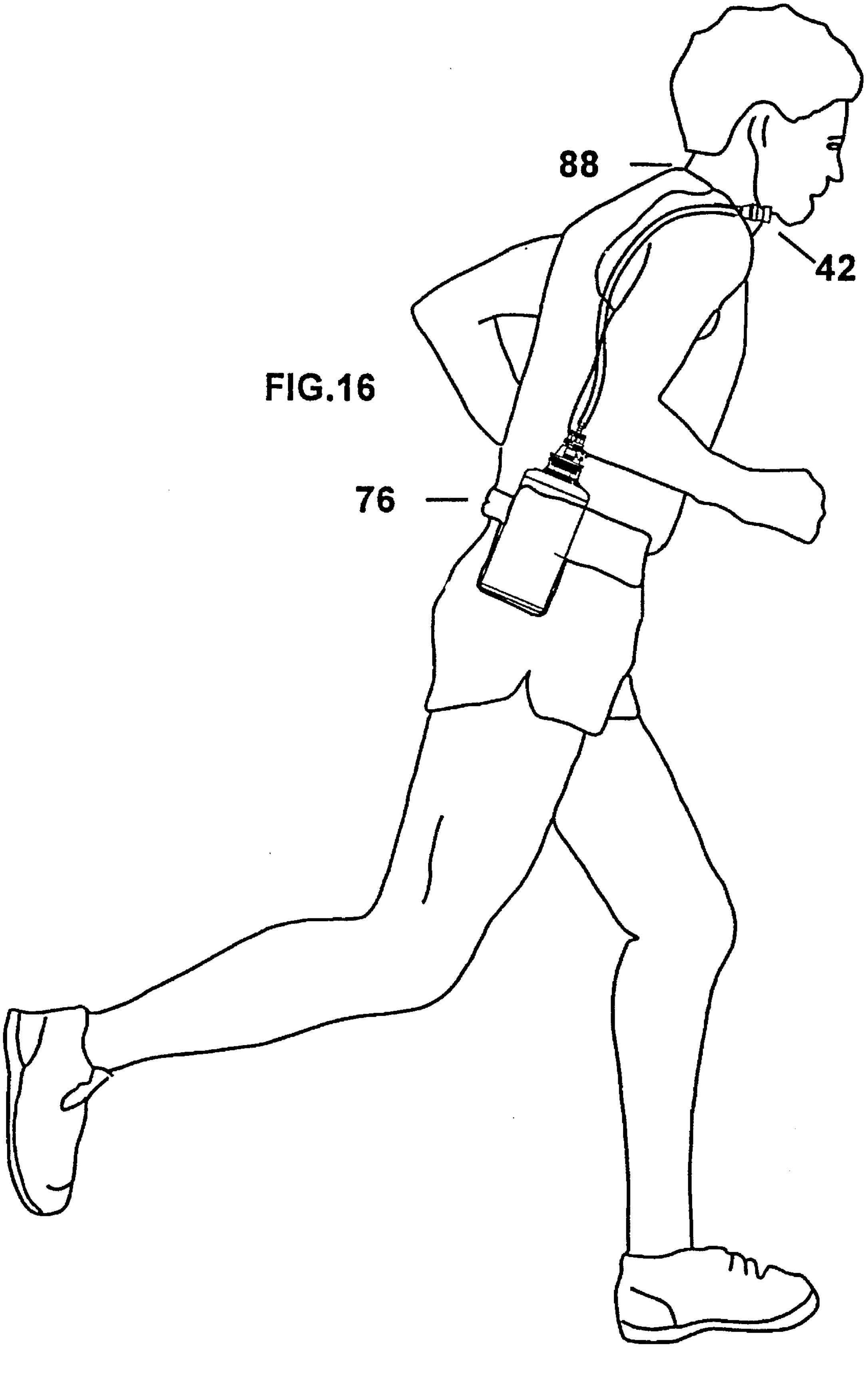
FIG. 16 is a side view of the pressurized dispensing device mounted to a water bottle or fanny pack.

The male coupling member 36 may be affixed to the bottom of the support cage 45, by a circular clip, clamp, or other means 66. Once the male coupling member 36 is mounted the nipple 52 of the male coupling 36 extends from the bottom of the support cage 44 as illustrated in FIG. 6. The nipple 52 is dimensioned to be sealingly engageable with the inner surface of the tubing 40 as illustrated in FIG. 13.

An opening 62 is formed in the top of the vessel with a threaded lip 58 through which fluid may be placed into the hollow cavity of the vessel 32. The female coupling member 34 is sealingly and threadingly engageable with the threaded lip of the vessel 32.

Figure 10:
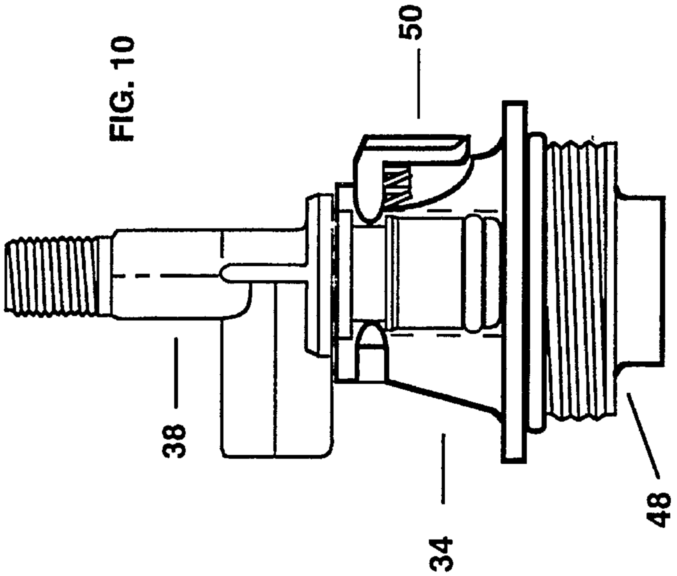
FIG. 10 is a fragmentary view of the female coupling member with the pressurizing adapter inserted into the female coupling member.
Figure 9:
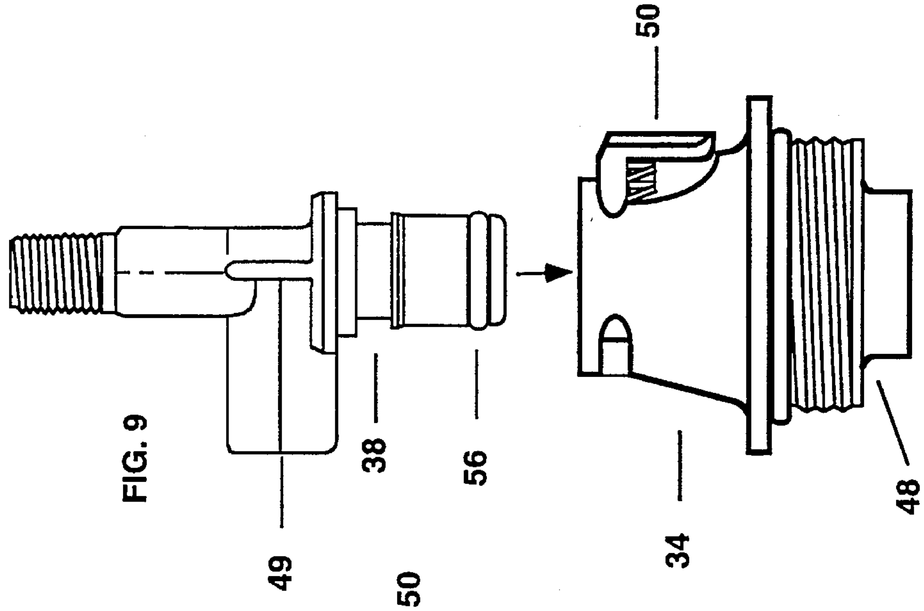
FIG. 9 is a side view illustrating insertion of the pressurizing adapter into the female coupling member.
Figure 8:
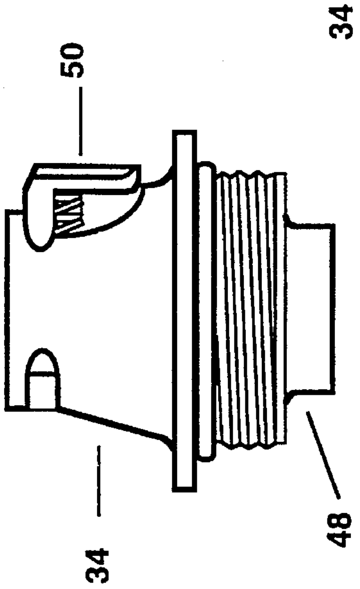
FIG. 8 is a side view of the female coupling member illustrating the check valve located within.

Fluid contained within the vessel 32 may be pressurized by using the male pressurizing adapter 38 to connect the vessel 32 to a bicycle pump, $CO_2$ cartridge, or similar means for supplying pressurized air as illustrated in FIG. 10. The check valve 49 located within the pressurizing adapter 38 will alert the individual when the appropriate pressure has been reached within the vessel. As an alternative, the check valve located in the pressurizing adapter may be relocated within the female coupling body.

The male coupling member 36 is sealingly engageable with the female coupling 34 member by insertion. The O-ring seal 56 comes in contact with the inner wall of the female coupling member 34 and the outer wall of the male coupling member 36 to form a seal which interconnects the vessel fluid to the tubing 40, which is sealingly engaged to the male coupling member.

The check valve 48 located within the female coupling member 34 selectively maintains the internal pressure of the vessel 32 when not coupled with the male coupling member 36 or pressurizing adapter 38, allowing the vessel to perform as a pre-charged cassette.

Figures 3, 4:
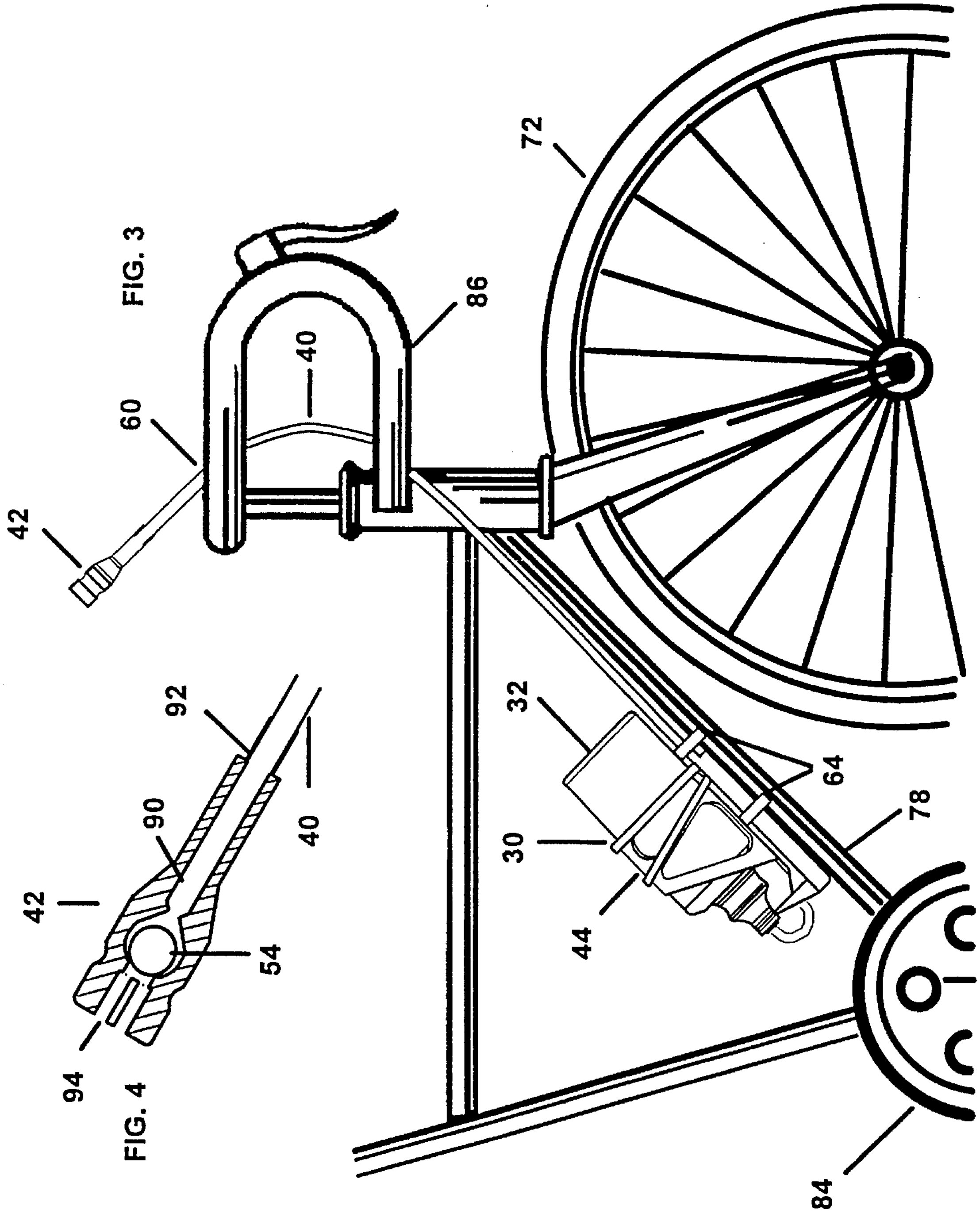
FIG. 3 is an enlarged, fragmentary view of the bicycle illustrating an alternative embodiment of the pressurized fluid dispensing device illustrated in FIG. 1.
FIG. 4 is an enlarged, fragmentary view of the actuateable valve of the pressurized fluid dispensing device illustrated in FIG. 3.

As illustrated in FIG. 4, the actuateable valve 42 includes a sphere 54 and a generally hollow member 90 tapering at one end to form a tube engaging portion 92 for sealing engagement with the tubing 40 or 40'. The other end of the member 90 includes an opening(s) through which fluid may pass. Located within the hollow member near the opening 94 is a sphere 54 which is in sealing engagement with the hollow member 90, but is separable when the hollow member is deformed from, for example, being bitten or pinched. Deformation of the hollow member 90 separates the sphere 54 and the hollow member 90 allowing fluid to flow through the hollow member. The particular valve is not essential to the present invention as long as it may be actuated by the mouth or hands of the individual. As illustrated in FIG. 10, the vessel acting as a pre-charged cassette is then inserted onto the male coupling member 36.

OPERATION AND USE

The pressurized fluid dispensing device 30 of the present invention is readily adaptable for use in activities such as bicycling, car racing, triathlons, rock climbing, wheel chairing and the like as illustrated in FIG. 1. It may be mounted to such mountables as a bicycle frame, wheel chair frame, car dash, and may even be worn on the body by mounting the device to what is commonly known as a water bottle or fanny pack located on the waist of the individual. It should also be appreciated that the device may be used in events where rehydration is needed.

In use, the vessel 32 is supplied with fluid, such as water, and screwably sealed by the female coupling member 34. Then the female coupling 34 is connected to the male pressurizing adapter 38 by insertion. Upon insertion the male pressurizing adapter 38 is locked into place by a slidable quick connecting/disconnecting clip 50. The pressurizing adapter 38 is then connected to a pressurizing system such as a bicycle pump and pressurized. A check valve 49 located in the pressurizing adapter will relieve any excess pressure and alert the user that the proper pressure has been attained. The pressurizing adapter 38 is then removed by depressing on the slidable quick connecting/disconnecting clip 50. The vessel 32 now acts as a pre-charged cassette. Next the male coupling member 36 is inserted into the female coupling member 34 thereby opening the check valve 48 located within the female coupling member 34 allowing the fluid to flow from the vessel 32, through the tubing 40/40', to the actuateable valve 42. The male coupling member 36 may be inserted by hand or mounted in a support cage 44 or the like such that the vessel 32 may be inserted onto the male coupling member 36.

In order for the individual to obtain fluid during their activity, he/she simply bites or pinches the actuateable valve 42 to deform the hollow member 90 and obtain the desired amount of fluid and releases the valve once the desired amount of fluid has been obtained. Once the fluid in the vessel 32 is exhausted, the spent vessel 32 can be removed and replaced with a new pressurized fluid vessel 32. Replacement of the vessel 32 can be readily accomplished by simply depressing the slidable quick connect/disconnect clip member 50 located on the female coupling member 34, discoupling the male and female coupling members 34/36 and inserting the male coupling member 36 in a new pre-charged vessel.

Furthermore, it should be appreciated that in the event of a pressure failure the vessel can be removed much like a conventional water bottle and, by removing the female coupling member 34, fluid can still be obtained by the rider.

While the preferred embodiment of the present invention has been described so as to enable one skilled in the art to practice the device of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. A fluid dispensing device comprising:

a vessel having a sealable opening, said vessel being pressurizable for storing and dispensing a fluid therein under pressure;

a first coupling member operable to substantially seal said opening and having a first check valve operable to releasably maintain a pressurized condition within said vessel;

a second coupling member operable to sealingly engage said first coupling member while opening said first check valve for dispensing fluid from within said vessel;

a tubing member attached to said second coupling member and having an actuatable valve disposed in communication therewith for dispensing fluid from said vessel through said tubing member;

a pressure adapter operable to sealingly engage said first coupling member to communicate a pressurized condition into said vessel; and a second check valve disposed in communication with said vessel, said second check valve operable for limiting pressure within said vessel.

2. A fluid dispensing device comprising:

a vessel having a sealable opening, said vessel being pressurizable for storing and dispensing a fluid therein under pressure;

a first coupling member operable to substantially seal said opening and having a first check valve operable to releasably maintain a pressurized condition within said vessel;

a second coupling member operable to sealingly engage said first coupling member while opening said first check valve for dispensing fluid from within said vessel;

a tubing member attached to said second coupling member and having an actuatable valve disposed in communication therewith for dispensing fluid from said vessel through said tubing member;

a pressure adapter operable to sealingly engage said first coupling member to communicate a pressurized condition into said vessel; and a spring-loaded clip member for retaining said second coupling member in an engaged relation with said first coupling member, thereby retaining said first check valve in an opened condition.

3. A fluid dispensing device comprising:

a vessel having an aperture, said vessel operable for storing a fluid under pressure;

a closure operable for being disposed in communication with said aperture of said vessel and having a check valve disposed in communication therewith;

pressurizing means for communicating a pressurized condition to said vessel, said pressurizing means operable for limiting pressure within said vessel;

delivery means disposed in communication with said closure for delivering fluid from said vessel; and spring loaded clip retaining means connecting said closure and said delivery means therebetween and thereby retaining said check valve in an opened condition.

4. The fluid dispensing device according to claim 3 wherein said closure comprises a threaded first coupling member adapted for being threadably engaged with said aperture of said vessel.

5. The fluid dispensing device according to claim 3 wherein said closure includes a first check valve operable to releasably maintain a pressurized condition within said vessel.

6. The fluid dispensing device according to claim 5 wherein said pressurizing means comprises a pressure adapter operable for engaging said closure while opening said first check valve.

7. The fluid dispensing device according to claim 5 wherein said delivery means comprises a second coupling member adapted for engagement with said closure, and wherein said engagement of said second coupling member with said closure is operable for maintaining said first check valve in an opened condition.

8. The fluid dispensing device according to claim 5 wherein said delivery means comprises a second coupling member adapted for engagement with said closure, and wherein said insertion of said second coupling member within a recess of said closure is operable for maintaining said first check valve in an opened condition.

9. The fluid dispensing device according to claim 3 wherein said pressurizing means includes a check valve designed to open at a predetermined pressure.

10. The fluid dispensing device according to claim 3 wherein said delivery means comprises a tubing member disposed in communication with said closure.

11. The fluid dispensing device according to claim 3 wherein said delivery means comprises an actuatable dispensing valve disposed in communication with said closure for selectively dispensing fluid under pressure from within said vessel.

12. The fluid dispensing device according to claim 3 wherein said delivery means comprises:

a second coupling member adapted for engagement with said closure; and an actuatable dispensing valve disposed in communication with said second coupling member for selectively dispensing fluid under pressure from within said vessel.

13. The fluid dispensing device according to claim 3 wherein said delivery means comprises:

a second coupling member adapted for engagement with said closure;

a tubing member disposed in communication with said second coupling member; and an actuatable dispensing valve disposed in communication with said tubing member for selectively dispensing fluid under pressure from within said vessel.

14. The fluid dispensing device according to claim 3 wherein said delivery means comprises a second coupling member adapted for engagement with said closure.

15. The fluid dispensing device according to claim 8 wherein said second coupling member is adapted for inserted engagement within said closure.

16. The fluid dispensing device according to claim 3 further comprising a support structure operable for mounting to a surface, said support structure operable to hold said vessel.

17. The fluid dispensing device according to claim 16 wherein said support structure is operable for retaining a portion of said delivery means.

18. The fluid dispensing device according to claim 3, wherein said closure comprises a threaded first coupling member adapted for being threadably engaged with said aperture of said vessel;

wherein said threaded first coupling member includes a first check valve operable to releasably maintain a pressurized condition within said vessel;

wherein said delivery means comprises a second coupling member adapted for inserted engagement within a recess of said closure; a tubing member disposed in communication with said second coupling member; and an actuatable dispensing valve disposed at a distal end of said tubing member for selectively dispensing fluid under pressure from within said vessel; and wherein said inserted engagement of said second coupling member within said recess of said closure is operable for maintaining said first check valve in an opened condition.

19. The fluid dispensing device according to claim 18 wherein said pressurizing means comprises a pressure adapter operable for engaging said closure while opening said first check valve and wherein said pressurizing means includes a check valve designed to open at a predetermined pressure.

20. The fluid dispensing device according to claim 18 further comprising a support structure operable for mounting to a surface for holding said vessel, said support structure further operable for retaining said second coupling member.

* * * * *